No. 808,913. PATENTED JAN. 2, 1906.
G. P. FINCH.
DEVICE FOR REMOVING OR REPLACING HAY RACKS OR THE LIKE
FROM OR TO THEIR RUNNING GEAR.
APPLICATION FILED SEPT. 19, 1905.
2 SHEETS—SHEET 1.
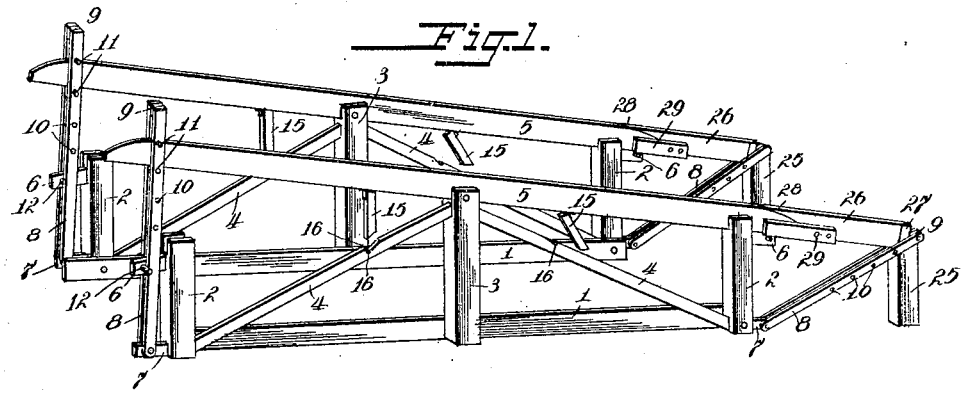
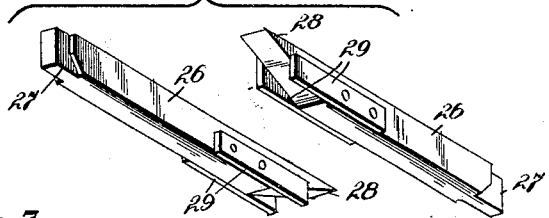
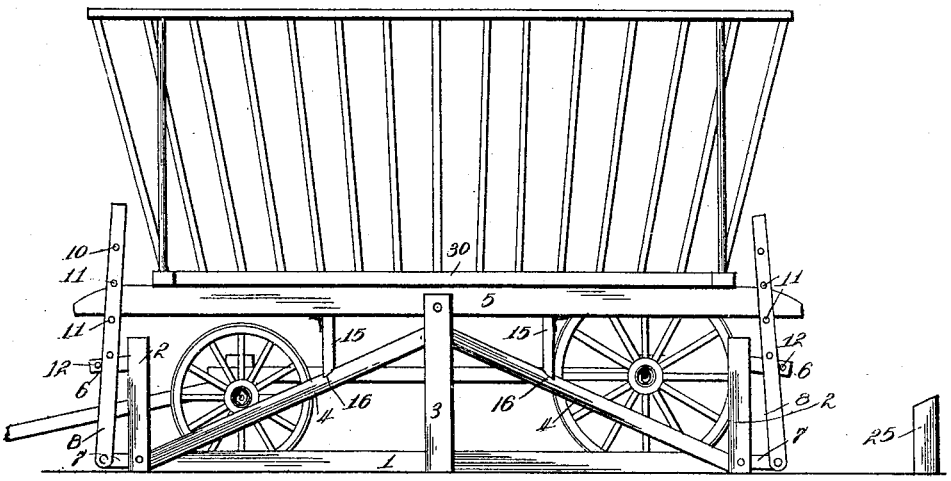
Witnesses
Inventor
George P. Finch
by Henry N. Copp
Attorney No. 808,913. PATENTED JAN. 2, 1906.
G. P. FINCH.
DEVICE FOR REMOVING OR REPLACING HAY RACKS OR THE LIKE FROM OR TO THEIR RUNNING GEAR.
APPLICATION FILED SEPT. 19, 1905.
2 SHEETS—SHEET 2.
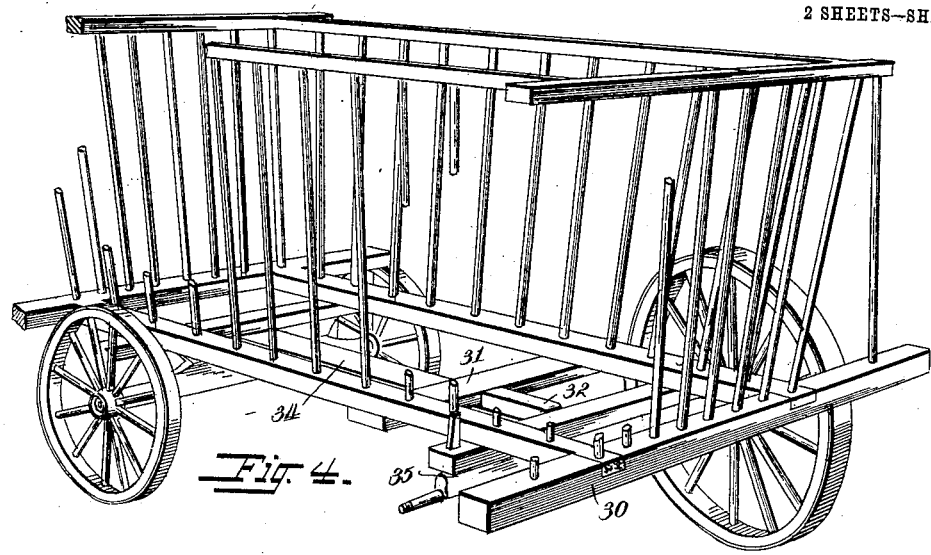
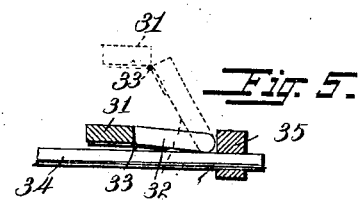
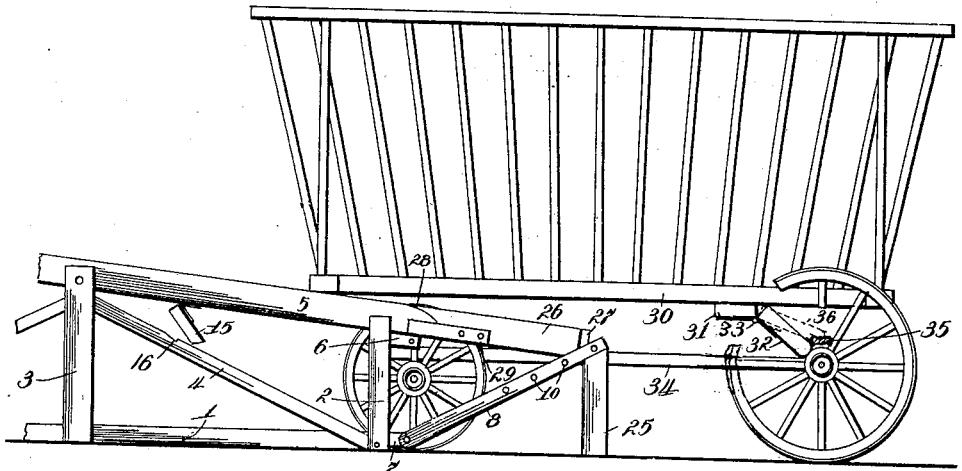
Witnesses
Milton Lenoir
Geo. A. Hawkins
Inventor
George P. Finch
by Henry W. Copp
Attorney

UNITED STATES PATENT OFFICE.

GEORGE P. FINCH, OF GARNEILL, MONTANA, ASSIGNOR OF ONE-THIRD TO ALEXANDER M. HILL AND ONE-THIRD TO WALTER H. PECK, BOTH OF GARNEILL, MONTANA.

DEVICE FOR REMOVING OR REPLACING HAY-RACKS OR THE LIKE FROM OR TO THEIR RUNNING-GEAR.

No. 808,913. Specification of Letters Patent. Patented Jan. 2, 1906.

Application filed September 19, 1905. Serial No. 279,103.

*To all whom it may concern:*

Be it known that I, GEORGE P. FINCH, a citizen of the United States, residing at Garneill, county of Fergus, and State of Montana, have invented certain new and useful Improvements in Devices for Removing Hay-Racks and Wagon-Boxes from Wagon Running-Gear and for the Replacement Thereof, of which the following is a specification.

The present invention is an improvement on the device for removing hay-racks and wagon-boxes from wagon running-gear and for the replacement thereof set forth in United States Letters Patent granted to Alexander M. Hill, January 3, 1905, No. 779,282; and my object is to provide improved skids adapted to coöperate with the ends of the tracks or ways of the device shown in that patent to facilitate the removal of a rack or box from a sled or low wagon.

Another object of the present invention is to provide novel means interposed between the wagon-box or hay-rack and the wagon running-gear whereby the wagon-box or hay-rack is more readily pushed onto the ways or tracks of the device shown in the aforesaid patent, thus relieving strain on the standards.

While the present invention is designed as an improvement on the device shown in Patent No. 779,282 to Alexander M. Hill, I wish it understood that its use is not necessarily thus restricted and that these improvements could be used on other hay-rack or wagon-box removers or replacers known to the art, if desired.

In the accompanying drawings, Figure 1 is a perspective view of the device shown in United States Patent No. 779,282 aforesaid, with the ways tilted to receive the wagon-box or hay-rack with the present improvements applied and in position to receive a rack or body from a sled or low wagon. Fig. 2 is a side elevation with the ways horizontally disposed and the rack supported thereby; Fig. 3, detail views of one of the improved detachable skids, and Figs. 4, 5, and 6 detail views of the improved attachment for the wagon-box or hay-rack.

Referring more especially to the drawings, 1 represents a base-piece, to which are secured the uprights 2 2 at each end of the base-pieces and central uprights 3, which are braced from each end of the upright 2 to the upper portion of the upright 3 by braces 4.

Pivotally secured to the upper portion of the uprights 3 are tracks or ways 5, which are adapted to rest when tilted in mortises formed in the upper portion of the uprights 2.

Extending outwardly from the uprights 2 are arms 6 and 7, to the latter of which are pivoted locking and supporting members 8, comprising two timbers, which are spaced apart at one end by the arm 7 and at the opposite end by a block 9. These members have a plurality of apertures 10, adapted to receive pins 11, which when the supporting members are thrown to upright position, as shown in Fig. 2, will support the tracks or ways 5 in any predetermined position. In the ends of the arms 6 are apertures adapted to receive pins 12, which lock the supporting members 8 in an upright position. Obviously there may be as many apertures in the supporting members as is deemed necessary, and the tracks or ways may be supported at any angle by the pins 11. Depending from the tracks 5 are auxiliary locking-catches 15, which are hinged to the tracks 5 and adapted to engage notches 16 in the braces 4. This construction holds the tracks in horizontal position irrespective of the locking members 8.

As above described, the device is in all respects similar to that shown in the patent to Alexander M. Hill, No. 779,282.

It is often desirable to unload racks or boxes from sleds or low wagons, and the ways 5 are too high to satisfactorily accomplish this operation, and I have therefore devised the following improvements: Posts 25 are driven into the ground to support the outer ends of the members 8. Supplemental tracks, ways, or skids 26 are provided, one of the ends of which are suitably reduced at 27 to fit in between the timbers of the members 8 at their outer ends 9, and these skids are beveled at their opposite ends at 28 and provided with side pieces 29 to engage the beveled ends of the ways 5. The skids 26 are detachable, so that they can be used at either end of the device to unload the rack or body from a sled or low wagon onto the tracks 5 or to load said rack or body back again onto the wagon running-gear.

Referring to Figs. 4, 5, and 6, I have provided certain improvements on the wagon box or rack by which as the team is driven between the tracks 5 the wagon box or rack 30 as it engages with said tracks will be the more readily and easily pushed onto said tracks without strain on the standards. To carry out this object, I secure to the bottom of the box or rack 30 a cross-piece 31, having hinged to and extending rearwardly therefrom a member 32, the hinge being shown at 33. The member 32 is adapted to lie along the top of the coupling, which secures the reach 34 to the rear bolster 35. When a box is to be unloaded from a sled which has no reach or coupling-pole, the lower end of the member 32 is notched, as shown by dotted lines at 36, so that said part can rest directly on the bolster 35.

The operation of the invention will be clear from the disclosures of Patent No. 779,282, except as to the improvements set forth herein. As the team is driven between the tracks 5, if a rack or box is to be unloaded from a sled or low wagon the box or rack rides up the skids 26 and passes onto the tracks 5, being pushed along by the movement of the vehicle on account of the engagement of the member 32 with the front of bolster 35; but the box or rack finally rises so high that the member 32 shifts from a horizontal to a vertical position and raises the rack or box clear off the bolster 35, and the box or rack is then supported by the tracks 5, and they tilt to horizontal position, as shown in Fig. 2, and are there locked by the supporting members 8, the skids 26 having been detached after the box or rack passes to the tracks 5, as will be well understood.

Having thus described my invention, what I claim as new, and desire to secure by Letters Patent, is—

1. In a device of the class described, the combination with tilting tracks or ways, of supplemental skids or tracks for facilitating the unloading of racks or boxes from sleds or low wagons onto the main tracks or ways and the loading thereof from the tracks or ways onto the running-gear.

2. In a device of the class described, the combination with tilting tracks or ways and supporting members therefor adapted to be extended horizontally or engaged with the tilting tracks or ways, of supplemental skids or tracks adapted for engagement with the main tracks or ways and with the supporting members when the said supporting members are extended horizontally for facilitating the unloading of racks or boxes from sleds or low wagons onto the main tracks or ways and the loading thereof from the tracks or ways onto the running-gear.

3. In a device of the class described, the combination with tilting tracks or ways and supporting members therefor adapted to be extended horizontally or engaged with the tilting tracks or ways, of supplemental skids or tracks adapted for detachable engagement with the main tracks or ways and also engageable with the supporting members when the latter are extended substantially horizontally, said supplemental skids being adapted to facilitate the unloading of racks or boxes from sleds or low wagons onto the main tracks or ways and the loading thereof from the tracks or ways onto the running-gear.

4. In a device of the class described, the combination with tilting tracks or ways, of supplemental skids or tracks, said supplemental skids being supported at their lower ends and detachably connected at their upper ends to the main tracks or ways and being adapted for facilitating the unloading of racks or boxes from sleds or low wagons onto the main tracks or ways and the loading thereof from the tracks or ways onto the running-gear.

5. In a device of the class described, the combination with tilting tracks or ways, of a wagon running-gear, a box or rack detachably supported thereby, and a member hinged to the wagon box or rack and positioned in front of the bolster of the running-gear for the purpose set forth.

6. In a device of the class described, the combination with tilting tracks or ways, of a wagon running-gear, a cross-piece secured to the bottom of the box or rack, and a member hinged to the cross-piece and adapted to engage the bolster of the running-gear.

In testimony whereof I hereunto affix my signature in presence of two witnesses.

GEORGE P. FINCH.

Witnesses:
J. J. SIGAFOOS,
W. H. PECK.